US012590650B2

(12) United States Patent
Fritz et al.

(10) Patent No.: US 12,590,650 B2
(45) Date of Patent: Mar. 31, 2026

(54) FEEDTHROUGH FOR APPLICATIONS AT HIGH PRESSURE

(71) Applicant: Schott AG, Mainz (DE)

(72) Inventors: Oliver Wolfgang Fritz, Obersüssbach (DE); Thomas Fink, Landshut (DE)

(73) Assignee: Schott AG, Mainz (DE)

( * ) Notice: Subject to any disclaimer, the term of this patent is extended or adjusted under 35 U.S.C. 154(b) by 833 days.

(21) Appl. No.: 17/236,655

(22) Filed: Apr. 21, 2021

(65) Prior Publication Data

US 2021/0324976 A1 Oct. 21, 2021

(30) Foreign Application Priority Data

Apr. 21, 2020 (DE) ..................... 10 2020 110 826.5

(51) Int. Cl.
*F16L 5/14* (2006.01)
*H02G 3/22* (2006.01)

(52) U.S. Cl.
CPC . *F16L 5/14* (2013.01); *H02G 3/22* (2013.01)

(58) Field of Classification Search
CPC ........... H02G 3/22; H01B 17/305; F16L 5/14; G21C 13/036; G21C 17/116
See application file for complete search history.

(56) References Cited

U.S. PATENT DOCUMENTS 2,903,504 A * 9/1959 Tuck .................... H01R 13/502
174/152 R
3,945,700 A * 3/1976 Didier ................... E21B 17/028
439/906

4,154,302 A * 5/1979 Cugini .................. E21B 17/003
166/88.1
(Continued)

FOREIGN PATENT DOCUMENTS

DE 1 490 333 1/1969
DE 10 2006 054 843 A1 4/2008
(Continued)

OTHER PUBLICATIONS

Januchta et al., "Breaking the Limit of Micro-Ductility in Oxide Glasses", Jul. 24, 2019, Adv. Sci. 2019, 6, p. 1-7 & 13.*
(Continued)

*Primary Examiner* — Timothy J Thompson
*Assistant Examiner* — Rhadames Alonzo Miller
(74) *Attorney, Agent, or Firm* — TAYLOR & EDELSTEIN, PC

(57) ABSTRACT

A feedthrough includes: a main body having at least one passage opening that extends through the main body; at least one first functional element which is disposed within the at least one passage opening and is connected to the main body in a fluid-tight manner; and an insulation material that surrounds at least some regions of the at least one first functional element and establishes the fluid-tight connection to the main body. Within the at least one first functional element, there is a pressure-guiding channel by which pressure components that have arisen as a result of pressure are guided from within the at least one first functional element outward to the surrounding insulation material such that a pressure resistance of the fluid-tight connection of the at least one first functional element to the main body is elevated.

17 Claims, 2 Drawing Sheets

(56) References Cited

U.S. PATENT DOCUMENTS

| | | | | |
|---|---|---|---|---|
| 4,331,833 | A * | 5/1982 | Pargamin | H01B 17/32 |
| | | | | 156/304.6 |
| 4,426,124 | A * | 1/1984 | Vandevier | H01R 13/5202 |
| | | | | 439/271 |
| 4,583,804 | A * | 4/1986 | Thompson | H01R 13/533 |
| | | | | 439/588 |
| 4,792,503 | A | 12/1988 | Eppley | |
| 4,797,117 | A | 1/1989 | Ayers | |
| 4,850,569 | A * | 7/1989 | Griffioen | G02B 6/4464 |
| | | | | 254/134.4 |
| 4,907,982 | A * | 3/1990 | Wagaman | H01R 13/523 |
| | | | | 439/271 |
| 6,093,886 | A * | 7/2000 | Bazizi | H01B 17/26 |
| | | | | 174/31 R |
| 9,413,152 | B2 | 8/2016 | Fritz et al. | |
| 9,759,532 | B2 * | 9/2017 | Hartl | F42B 3/198 |
| 2004/0103600 | A1 * | 6/2004 | Broder | H02G 3/22 |
| | | | | 52/220.8 |
| 2006/0179950 | A1 | 8/2006 | Rasmussen | |
| 2013/0228657 | A1 * | 9/2013 | Sprenger | H02G 3/08 |
| | | | | 248/56 |
| 2017/0183935 | A1 * | 6/2017 | Brown | E21B 43/128 |
| 2018/0205208 | A1 * | 7/2018 | Leutenegger | H02G 15/025 |
| 2019/0006066 | A1 * | 1/2019 | Suttner | H01B 17/305 |
| 2020/0287369 | A1 * | 9/2020 | Kaun | H02G 3/0456 |
| 2020/0295554 | A1 * | 9/2020 | Ehmann | H02G 3/22 |

FOREIGN PATENT DOCUMENTS

| | | | |
|---|---|---|---|
| DE | 10 2016 103 485 A1 | 8/2017 | |
| JP | 50-4287 U | 1/1975 | |
| JP | 2014-164978 A | 9/2014 | |

OTHER PUBLICATIONS

English machine translation of Japanese Patent No. 50-4287 issued Jan. 17, 1975 (7 pages).

* cited by examiner

FEEDTHROUGH FOR APPLICATIONS AT HIGH PRESSURE

CROSS REFERENCE TO RELATED APPLICATIONS

This application claims priority to German Patent Application No. DE 10 2020 110 826.5 filed on Apr. 21, 2020, which is incorporated in its entirety herein by reference.

BACKGROUND OF THE INVENTION

1. Field of the Invention

The invention relates to a feedthrough for applications at high pressure, and to the use thereof at high pressure.

2. Description of the Related Art

Feedthroughs that have to reliably withstand high pressures are used for a multitude of applications. Especially when these feedthroughs come into contact with fluids under high pressure on one side, the operationally reliable use thereof and the sustained operational integrity thereof is of great importance from a safety point of view as well. These applications include deep-sea equipment, for example oil drilling and exploration equipment, or else the use thereof in chemically polluted or irradiated environments, for example in the chemical industry or in energy installation and reactor technology. Further applications also include, for example, manned and unmanned watercraft, for example diving robots and submarines, and specialty gas tanks, such as $CO_2$ stores or $H_2$ tanks for motor vehicles with fuel cells.

U.S. Pat. No. 4,797,117 discloses connectors with a rubber sheath within which sealing lip rings of wedge-shaped cross section are sealed onto an insulated conductor by pressing by an element having conical openings. This construction of the connector is especially intended to enable on-site installation and repair thereof.

U.S. Patent Application Publication No. 2006/0179950 A1 discloses a casing feedthrough for a component comprising a pressure sensor, having a fluid ring seal of essentially wedge-shaped cross section, which surrounds the component in a sealing manner within a frustoconical opening of the housing. In order to specify a simpler production method, it is suggested that the wedge-shaped fluid ring seal be introduced with such high forces that at least the elastic deformation limit either of the housing or of the component is exceeded.

German Patent Application No. DE 10 2006 054 843 A1 discloses an electrical feedthrough, especially for pressure applications, having a housing aperture at least in the region of a first end of the housing, wherein the pressurized housing side forms at least two openings in a section of the outer face of the housing. The at least two openings are preferably of equal area or essentially of equal area. The at least two openings are additionally offset at equal angle intervals about the housing axis, preferably in such a way that the axes of the openings and hence also the force lines of the forces that result from the pressure on the pressure side intersect at a common point, preferably together with the housing axis. This design is intended to result in compensation of the forces that act on the openings in pressure applications. The disadvantage of this feedthrough is that the forces that result from pressurization are passed through the insulation material that surrounds the respective conductor, and compensation can be achieved only in pairs with two respective conductors. In this arrangement, moreover, the respective conductors are angled by 90° within a housing opening, which not only makes production difficult but also complicates the geometry of the conductor routing. Furthermore, the geometric dimensions demand several times the amount of space than would be necessary in the case of straight conductor routing.

German Patent Application No. DE 10 2016 103 485 A1 describes a feedthrough, especially for applications at high outside pressure, in which a functional element is disposed within a passage opening of a main body and is held therein in a fluid-tight manner by means of a surrounding insulation material. A pressure compensation device provides for, for example, an annular groove or blind openings in the main body material, in order to conduct pressure components to edge regions of the insulation material. According to the material or geometry of the main body or of the functional element, however, such a pressure compensation device can sometimes be difficult to produce or be unachievable. Furthermore, the depth of the groove or blind openings introduced into the main body is limited, such that the effect of the pressure compensation device in the longitudinal direction of the functional element is limited to partial regions of the main body.

What is needed in the art are feedthroughs where functional elements are kept fluid-tight in a reliable manner over a sustained period of operation, even at high pressures. This is also to be enabled when recesses in the main body material are unwanted or impossible, for example because of the material or the geometry of the feedthrough. What is also needed in the art is a way to divert high pressures in a stabilizing manner in such a way that pressure stabilization in the transverse direction throughout the main body becomes possible in the longitudinal direction of a functional element.

SUMMARY OF THE INVENTION

In some exemplary embodiments provided according to the invention, a feedthrough includes: a main body having at least one passage opening that extends through the main body; at least one first functional element which is disposed within the at least one passage opening and is connected to the main body in a fluid-tight manner; and an insulation material that surrounds at least some regions of the at least one first functional element and establishes the fluid-tight connection to the main body. Within the at least one first functional element, there is a pressure-guiding channel by which pressure components that have arisen as a result of pressure are guided from within the at least one first functional element outward to the surrounding insulation material such that a pressure resistance of the fluid-tight connection of the at least one first functional element to the main body is elevated.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
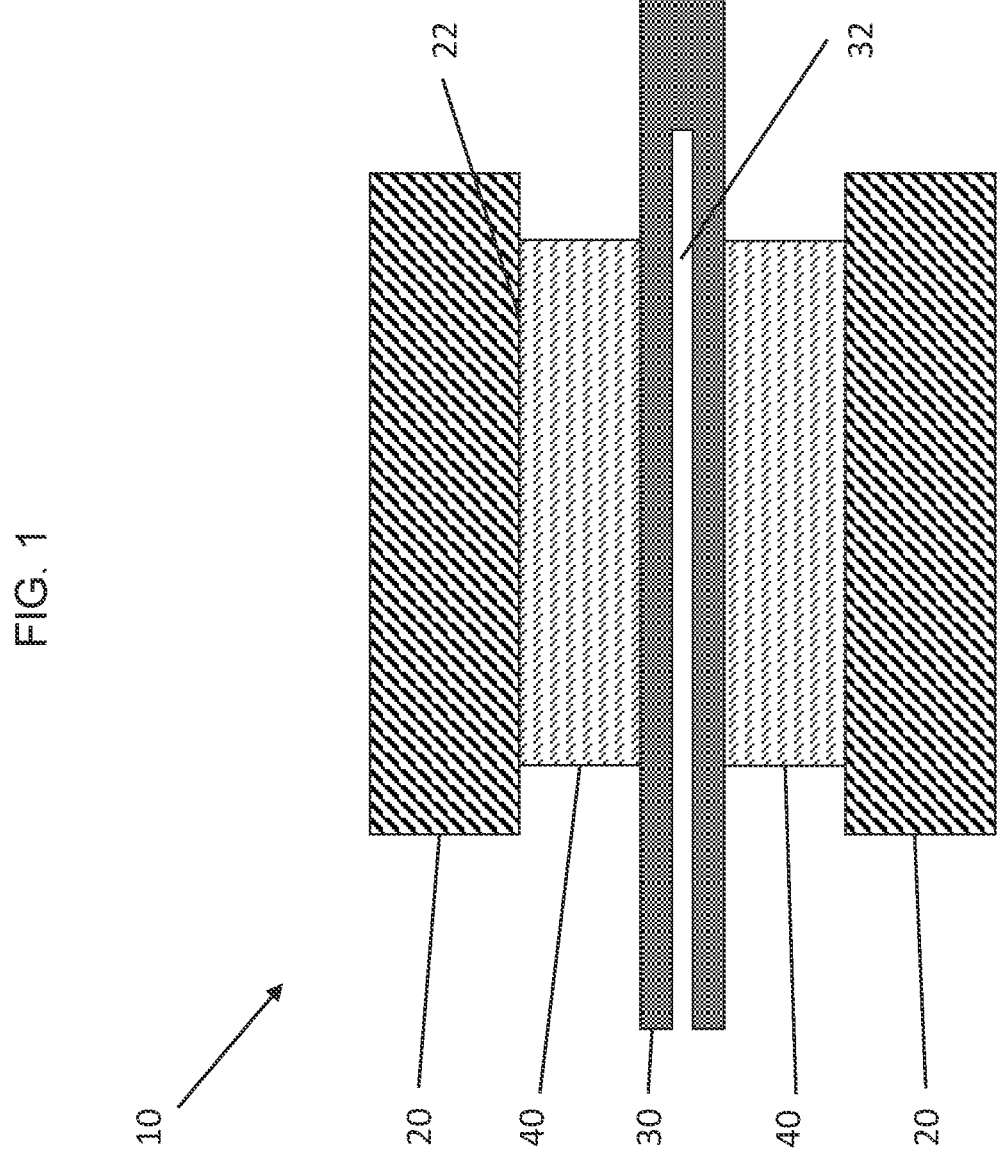
FIG. 1 is a cross-sectional illustration through an exemplary embodiment of a feedthrough provided according to the invention with a first functional element.

Exemplary embodiments provided according to the present invention provide a feedthrough, which is well-suited for applications at high pressure, including a main body with at least one passage opening that extends through the main body, at least one first functional element which is disposed within the at least one passage opening and is connected to the main body in a fluid-tight manner, and an insulation material that surrounds at least some regions of the first functional element and establishes the fluid-tight connection to the main body.

Within the first functional element, there is a pressure-guiding channel by which pressure components that have arisen as a result of the pressure are guided from within the first functional element outward to the surrounding insulation material, such that the pressure resistance of the fluid-tight connection of the at least one first functional element to the main body is elevated.

In other words, the pressure-guiding channel is within the functional element itself and may take the form, for example, of a recess or of a clearance within the functional element. Exemplary embodiments provided according to the invention thus enable an increase in pressure resistance even when recesses in the main body material are unwanted or impossible. Because the functional element frequently protrudes on either side of the main body, it is even possible to achieve pressure stabilization in a transverse direction right across the main body.

In a surprising manner, by virtue of these measures, the connection between the main body and the functional element, especially the connection of the insulation material to the main body, compared to a feedthrough without a pressure-guiding channel, was able to withstand operating pressures in a fluid-tight manner that are higher by more than 10%, such as more than 20%, more than 50%, more than 75% or more than 100%. In the same way, it was thus possible to increase the pressure resistance of the feedthrough by more than 10%, such as more than 20%, more than 50%, more than 75%, or more than 100%.

Since such feedthroughs can be used in a versatile manner, especially for deep-sea equipment, for example in a mineral oil and/or natural gas drilling or exploration device, and/or in chemically polluted or irradiated environments, for example in the chemical industry or in energy installation and reactor technology, especially in areas at risk of explosion, in an energy generation or energy storage device with a housing, or in an encapsulation of an energy generation device or of an energy storage device or of a reactor or of a storage device for toxic and/or harmful material, especially as feedthrough device within the containment of a reactor or feedthrough device through the containment of a reactor, especially of a chemical or nuclear reactor, or in a spacecraft or space exploration vehicle, or in a housing of a sensor and/or actuator, the pressure that acts on the feedthrough, for example in the case of reactors, may be an internal pressure, and in other applications, for example in deep-sea applications, may be an external pressure, and hence an outside pressure. Consequently, the pressurized side of the main body shall refer to that side of the main body that is acted on by the elevated external or internal pressure, and consequently generally the elevated pressure, while the other side shall be referred to as the nonpressurized side.

The pressure on the pressurized side is thus guided by the pressure-guiding channel into the interior of the first functional element. From the interior of the functional element, therefore, pressure components resulting from the pressure of the pressurized side act outward. In some embodiments, the feedthrough takes such a form that the pressure components resulting from the pressure are guided at right angles to the longitudinal direction of the passage opening from within the first functional element outward to the surrounding insulation material.

The first functional element may be in tubular form at least in sections, with a pipe wall that surrounds an internal cavity, in such a way that the internal cavity or parts of the internal cavity form(s) the pressure-guiding channel of the first functional element.

The pressure-guiding channel may take the form, for example, of a blind opening within the functional element. The pressure-guiding channel may alternatively, for example, take the form of a passage opening in a first functional element, the whole of which is then in tubular form, for example, in which case there may be a second functional element which is disposed within the first functional element, spaced apart by a gap, and which may be connected to the first functional element at a particular point in the longitudinal direction, for example terminally, in order to close the gap.

In more general terms, a second functional element may accordingly be included, which is disposed within the first functional element, especially disposed within the internal cavity of the first functional element in tubular form. An interspace may remain between the first functional element and the second functional element disposed therein, which forms the pressure-guiding channel. Also included may be a connecting material that surrounds at least some regions of the second functional element and establishes a fluid-tight connection to the first functional element. The connecting material may be disposed, for example, terminally on the first functional element and/or form the end of the pressure-guiding channel.

In some embodiments, the whole of the first functional element is in tubular form and extends through the passage opening of the main body.

In addition, the whole of the second functional element may extend through the internal cavity of the first functional element in tubular form.

There also may remain an annual interspace between the first functional element and the second functional element disposed therein, which forms the pressure-guiding channel.

The second functional element may be surrounded by a connecting material in an annular manner, which forms the end of the pressure-guiding channel and is disposed, for example, closer to the nonpressurized side than to the pressurized side of the main body or of the first functional element or of the second functional element.

When at least two functional elements, for example a first and a second, are provided, the first functional element may have a lower coefficient of thermal expansion than the second functional element. Alternatively or additionally, the second functional element may have a higher electric conductivity than the first functional element. Alternatively or additionally in turn, the connecting material between the first functional element and the second functional element may have a lower hardness than the insulation material between the first functional element and the main body.

In some embodiments, the feedthrough may take the form, for example, of an electrical power feedthrough in order to conduct high currents through the feedthrough. For this purpose, the first functional element may take the form, for example, of a sealed tube melted into the main body by glass, with a copper contact extending through the sealed tube. Since copper and glass have comparatively different coefficients of thermal expansion, the sealed tube may then be provided, for example, with an alloy of lower ductility, in order to compensate for this mismatch in the coefficients of thermal expansion. The melting tube may be joined to the copper contact at one end, for example, by a hard solder, for example simultaneously with the melting process.

The main body to which the functional element is connected in a fluid-tight manner may comprise or consist of a metal, especially steel, stainless steel, FeCo alloys, titanium, titanium alloys, aluminum and aluminum alloys, an iron-nickel alloy such as Kovar, or a nickel-chromium alloy such as Inconel, for example Inconel 690 and/or Inconel 625.

The insulation material that establishes the fluid-tight connection may comprise or consist of glass, glass-ceramic material and/or ceramic material. In some embodiments, the feedthrough may comprise a pressure vitrification in which the glass and/or the glass-ceramic material and/or the ceramic material is bonded in each case in a fluid-tight manner at least in some regions to the main body and the first functional element.

The first functional element, which is disposed in the passage opening of the main body, may comprise or consist of a metal.

Any second functional element present, which is disposed within the first functional element, for example, may comprise or consist of a metal, for example copper. Connecting material that connects the first functional element to the second may comprise or consist of a metal or an alloy, for example may take the form of a hard solder.

Especially if only a first functional element is included, but in principle also irrespective of that, the first functional element may comprise or consist of one of the materials mentioned previously for the second functional element.

The feedthrough, for example in the embodiment with a first tubular functional element and a second functional element extending through it, may have a pressure resistance of at least 400 bar, such as of at least 500 bar, or of at least 600 bar.

The invention also further relates to the use of one of the feedthroughs as described previously in an application with pressures of at least 400 bar, such as of at least 500 bar or of at least 600 bar.

The invention also relates to the use of one of the feedthroughs as described previously for deep-sea equipment, for example in a mineral oil and/or natural gas drilling or exploration device, and/or in chemically polluted or irradiated environments, for example in the chemical industry or in energy installation and reactor technology, especially in areas at risk of explosion, in an energy generation or energy storage device with a housing, or in an encapsulation of an energy generation device or of an energy storage device or of a reactor or of a storage device for toxic and/or harmful material, especially as feedthrough device within the containment of a reactor or feedthrough device through the containment of a reactor, especially of a chemical or nuclear reactor, or in a spacecraft or space exploration vehicle, or in a housing of a sensor and/or actuator, in or on manned and unmanned watercraft, for example diving robots and submarines, and gas tanks, especially $CO_2$ stores or $H_2$ tanks, and also for motor vehicles with fuel cells.

The feedthroughs provided according to the invention may find use for electrical power feedthroughs on a GTMS basis (glass-to-metal seal), into which copper conductors are vitrified by vitrification tubes. Fields of use may, for example, be cable feedthroughs for nuclear reactor feedthroughs, liquefied gas tankers, mineral oil/natural gas exploration and production and/or energy generation.

Referring now to the drawings, FIG. 1 shows a feedthrough 10 having a main body 20, in the form of a housing, through which a passage opening 22 extends. Within the passage opening 22 that extends through the main body 20 there is disposed a functional element 30, in the form of electrical contact. The functional element 30 is connected in a fluid-tight manner to the main body 20 by an insulation material 40. The insulation material 40 takes the form of vitrification glass and is within the passage opening 22 of the main body, more specifically between the main body 20 and the functional element 30.

Within the functional element 30 is a pressure-guiding channel 32 which may take the form, for example, of a central hole. The pressure-guiding channel 32 can guide pressure components from within the first functional element 30 outward to the surrounding insulation material 40, such that the functional element 30 is incorporated within the insulation material 40 with elevated pressure resistance and/or the insulation material 40 within the main body 20 with elevated pressure resistance.

The pressure-guiding channel 32 may especially extend throughout the longitudinal direction (axial direction) of the insulation material 40 and/or of the main body 20, such that pressure stabilization is possible throughout the longitudinal direction.

Figure 2:
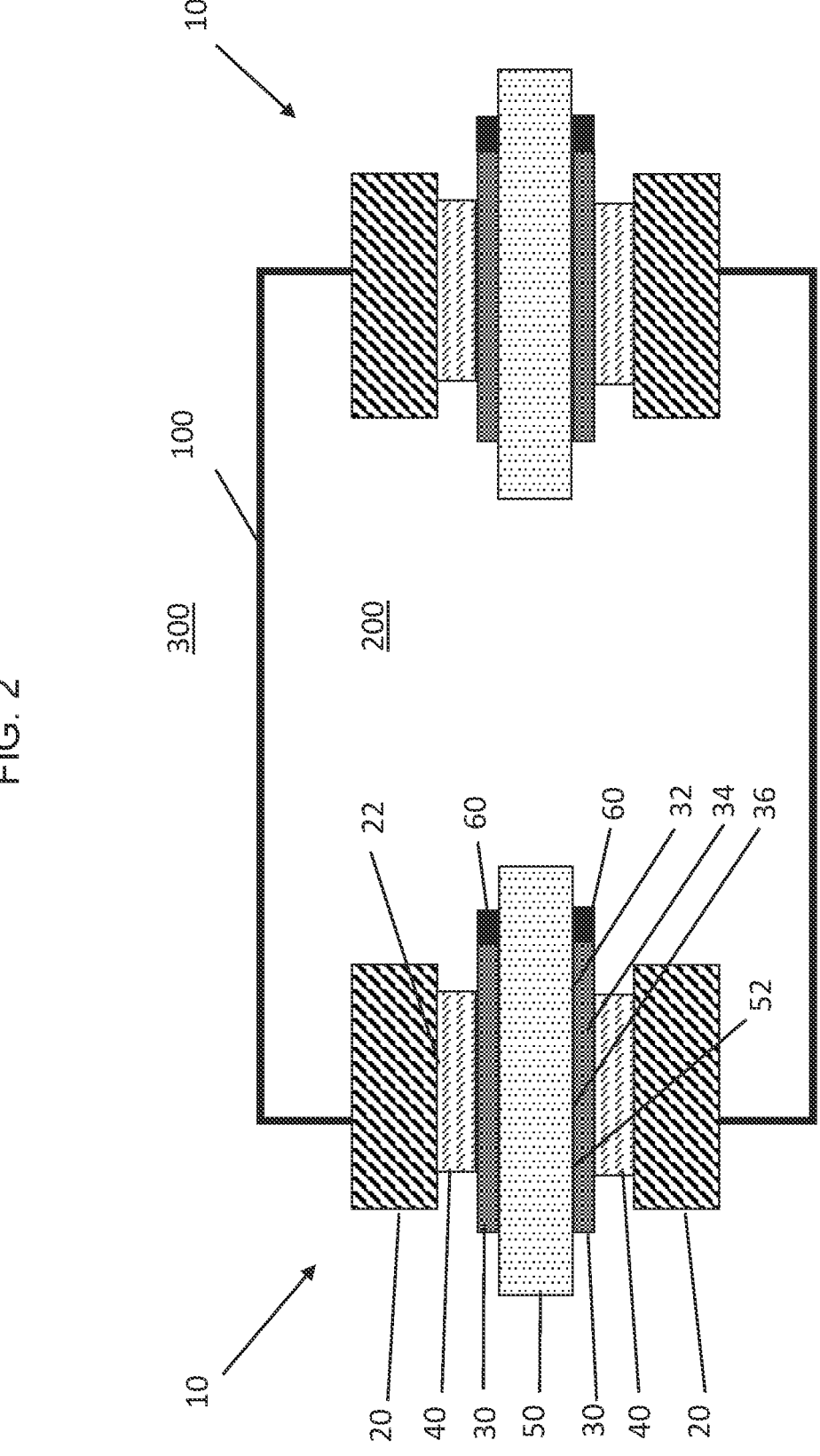
FIG. 2 is a cross-sectional illustration through a vessel with an exemplary embodiment of a feedthrough provided according to the invention having a first functional element and second functional element, the feedthrough being installed in two configurations.

As shown in FIG. 2, the vessel 100 surrounds an interior 200 faced by an exterior 300. Between this interior 200 and exterior 300, a feedthrough 10 and a further feedthrough 10' are then disposed in the vessel wall, especially in order to exchange electrical or some other signals between the interior 200 and the exterior 300.

The feedthroughs 10, 10' each have a main body 20, through which a passage opening 22 extends. Incorporated in the passage opening 22 is a tubular first functional element 30, wherein an insulation material 40 establishes a fluid-tight connection in between. The first functional element 30 here takes the form of a tube, wherein a second functional element 50 extends through the internal cavity 36 thereof and serves as an electrical conductor. Between the first and second functional elements, there remains an annular interspace 52 or a gap into which pressure can penetrate from the pressurized side. On the nonpressurized side, the interspace 52 is sealed by the connecting material 60. The interspace 52 accordingly forms a pressure-guiding channel 32 into the interior of the first functional element 30, such that the high pressure can act outward therefrom and hence presses the tube outward against the insulation material 40. This stabilizes the feedthrough, especially against pushing of the first functional element 30 out of the main body in its longitudinal direction.

FIG. 2 distinguishes between two cases. In the case that the exterior 300 has a higher pressure than the interior 200, incorporation is effected according to the feedthrough 10 (on the left). The high outside pressure can thus penetrate into the pressure-guiding channel 32 and stabilize the feedthrough. In the reverse case that the interior 200 has a higher pressure than the exterior 300, incorporation is effected according to the feedthrough 10' (on the right). The high internal pressure can thus penetrate into the pressure-guiding channel 32 and stabilize the feedthrough.

The invention thus provides a solution for increasing pressure resistance, wherein an open side of the first functional element 30 is in a pressure-exposed arrangement in order to achieve a self-reinforcing arrangement with increasing pressure. The open region of the functional element 30 that projects out of the insulation material 40 experiences isobaric pressure conditions, while the region in the insulation material 40 is pushed ever more strongly against the insulation material 40 with increasing pressure. Embodiments provided according to the invention can accordingly achieve an extreme increase in the pressure resistance of feedthroughs in a surprisingly simple manner.

In this example, the feedthroughs 10, 10' take the form of electrical power feedthroughs, wherein the copper conductors 50 are vitrified into the main body 20 by vitrification tubes 30 with a pressure vitrification 40. The vitrification tube 30 serves here for matching of expansion to the vitrification glass 40, since the copper conductor 50 has a comparatively large difference with regard to the coefficient of thermal expansion relative to the glass 40. The copper contact 50 is connected at the end of the vitrification tube 30 by hard solder 60.

In experiments, it was found that the feedthrough 10 withstood a pressure of 680 bar without damage in the presence of a pressure-guiding channel 32, whereas, in the absence of a pressure-guiding channel 32, the integrity of the feedthrough failed over and above a pressure of 380 bar. In the absence of the pressure-guiding channel 32, it was even possible to force the copper contact together with the vitrification tube out of the vitrification.

While the vessel 100 shown in FIG. 2 comprises at least one feedthrough 10, 10' having a first and a second functional element 30, 50, it may also be the case that the vessel 100 comprises at least one feedthrough having only a first functional element, for example according to FIG. 1.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A feedthrough, comprising:
    a main body having at least one passage opening that extends through the main body;
    at least one first functional element which is disposed within the at least one passage opening and is connected to the main body in a fluid-tight manner; and
    an insulation material that surrounds at least some regions of the at least one first functional element and establishes the fluid-tight connection to the main body, wherein, within the at least one first functional element, there is a pressure-guiding channel by which pressure components that have arisen as a result of pressure are guided from within the at least one first functional element outward to the surrounding insulation material such that a pressure resistance of the fluid-tight connection of the at least one first functional element to the main body is elevated, the insulation material comprising at least one of glass, glass-ceramic material, or ceramic material.

2. The feedthrough of claim 1, wherein the pressure components that have arisen as a result of the pressure are directed perpendicular to a longitudinal direction of the at least one passage opening from within the at least one first functional element outward to the surrounding insulation material.

3. The feedthrough of claim 1, wherein the at least one first functional element is in tubular form at least in sections with a tube wall surrounding an internal cavity and the internal cavity or parts of the internal cavity form the pressure-guiding channel of the at least one first functional element.

4. The feedthrough of claim 3, further comprising a second functional element which is disposed within the internal cavity of the at least one first functional element in tubular form.

5. The feedthrough of claim 1, further comprising a second functional element which is disposed within the at least one first functional element.

6. The feedthrough of claim 5, wherein there remains an interspace that forms the pressure-guiding channel between the at least one first functional element and the second functional element disposed therein.

7. The feedthrough of claim 5, further comprising a connecting material that surrounds at least some regions of the second functional element and establishes a fluid-tight connection with the at least one first functional element.

8. The feedthrough of claim 7, wherein the connecting material is disposed terminally on the at least one first functional element.

9. The feedthrough of claim 8, wherein the connecting material at least one of is disposed terminally on a nonpressurized side of the feedthrough or forms an end of the pressure-guiding channel.

10. The feedthrough of claim 7, wherein at least one of the following is satisfied:
    a whole of the at least one first functional element is in tubular form and extends through the at least one passage opening of the main body;
    a whole of the second functional element extends through an internal cavity of the at least one first functional element in tubular form;
    there remains an annular interspace that forms the pressure-guiding channel between the at least one first functional element and the second functional element disposed therein; or
    the second functional element is surrounded by the connecting material in an annular manner and the connecting material forms an end of the pressure-guiding channel.

11. The feedthrough of claim 7, wherein at least one the following is satisfied:
    the at least one first functional element has a lower coefficient of thermal expansion than the second functional element;
    the second functional element has a higher electrical conductivity than the at least one first functional element; or
    the connecting material between the at least one first functional element and the second functional element has a lower hardness than the insulation material between the at least one first functional element and the main body.

12. The feedthrough of claim 7, wherein at least one of the following is satisfied:

the second functional element comprises at least one of a metal or copper; or the connecting material comprises at least one of a metal, an alloy, or a hard solder.

13. The feedthrough of claim 1, wherein the main body comprises at least one of a metal, steel, stainless steel, an FeCo alloy, titanium, a titanium alloy, aluminum, an aluminum alloy, an iron-nickel alloy, or a nickel-chromium alloy.

14. The feedthrough of claim 1, further comprising a pressure vitrification in which the at least one of glass, glass-ceramic material, or ceramic material of the insulation material is connected in each case in a fluid-tight manner at least in some regions to the main body and the at least one first functional element.

15. The feedthrough of claim 1, wherein the at least one first functional element comprises at least one of a metal or copper.

16. The feedthrough of claim 1, wherein the feedthrough has a pressure resistance of at least 400 bar.

17. The feedthrough of claim 16, wherein the feedthrough has a pressure resistance of at least 600 bar.

*     *     *     *     *